U`nited States Patent [19]

Saen et al.

[11] Patent Number: 4,873,411
[45] Date of Patent: Oct. 10, 1989

[54] METHOD OF SPOT-WELDING FLAT-TYPE ELECTRICAL WIRES TO METAL TERMINALS

[75] Inventors: Haruo Saen; Kougi Kobayashi, both of Tochigi, Japan

[73] Assignee: Sumitomo Electric Industries, Ltd., Osaka, Japan

[21] Appl. No.: 141,749

[22] Filed: Jan. 11, 1988

[30] Foreign Application Priority Data

Jan. 9, 1987 [JP] Japan .................................. 62-2861

[51] Int. Cl.$^4$ ............................................. B23K 11/14
[52] U.S. Cl. .................................. 219/93; 219/91.21
[58] Field of Search ................ 219/91.21, 92, 93, 91.2

[56] References Cited

U.S. PATENT DOCUMENTS 928,701 7/1909 Rietzel .................................. 219/93
3,805,014 4/1974 Becker .................................. 219/93

Primary Examiner—Clifford C. Shaw
Attorney, Agent, or Firm—Sughrue, Mion, Zinn, Macpeak & Seas

[57] ABSTRACT

In a method of spot-welding flat-type electrical conductors, sandwiched between insulators, to metal terminals, a portion of one insulator layer is removed from an end portion of a flat-type electrical conductor to expose the electrical conductors on one side. The end portion of the electrical conductors is put between two metal plates which is connected to form a metal terminal. A projection is formed on the metal plate which is disposed on the exposed conductor side such that it is in contact with the conductor before the conductor is spot-welded to the metal plates.

3 Claims, 1 Drawing Sheet

METHOD OF SPOT-WELDING FLAT-TYPE ELECTRICAL WIRES TO METAL TERMINALS

BACKGROUND OF THE INVENTION

This invention relates to a method of connecting electrical wires to connectors to produce highly reliable connections which are required when connecting components in data processing units, electrical appliances and automobile control units.

A conventional method of spot-welding a flat-type electrical wire 10, which includes a conductor 11 sandwiched between insulators 12 and 12', to a metal terminal 20 is illustrated in FIG. 1. One end portion of the flat-type electrical wire, after the conductor 11 has been exposed as illustrated, is inserted into the metal terminal 20 in such a manner that a projection 22 on a metal plate 23 of the metal terminal 20 is in contact with a portion of the insulator 12' opposite the exposed conductor. Thereafter, a preheating current, $I_p$, is applied to the metal terminal through an electrode 30 of a spot welding machine, causing the metal terminal 20 to generate heat. The heat thus generated melts the portion of insulator 12' in contact with the projection 22. As a result, a welding current, $I_w$, flows as shown in FIG. 2.

The projection 22 is brought into contact with the insulator 12' of the electrical wire 10 when the latter is inserted into the metal terminal 20 for the purpose of pushing away the insulator 12' made molten by the preheating current, $I_p$, and thereby cause the projection 22 to contact the conductor 11.

In the conventional method described above, the projection extends from the metal plate 23 which is on the insulator 12' side of the electrical wire 10 when the electrical wire is inserted into the metal terminal 20. Therefore, the contact resistance between the conductor 11 and the projection 22 may fluctuate depending on the force imparted by the projection while pushing on the molten insulator. Furthermore, because of changes, even small changes, in the force imparted by the projection on the conductor 11, the contact resistance between the projection and the conductor may be larger or smaller than that between the conductor 11 and the metal plate 24 which has no projection. A higher contact resistance will produce a greater welding strength. Therefore, the conductor and the metal plate 23 having the projection 22 may be welded together more firmly than the conductor and the metal plate 24 having no projection, or vice versa. That is, the welding strength might not be uniform.

SUMMARY OF THE INVENTION

Accordingly, an object of this invention is to eliminate the above-described difficulties accompanying the conventional method of spot-welding a flat-type electrical wire to a metal terminal.

The foregoing object and other objects of the invention as will be apparent from the following description of the invention have been achieved by the method of this invention of spot-welding flat-type electrical wires to metal terminals in which one end portion of a flat-type electrical wire, in which an insulator has been removed to expose an electrical conductor on one side, is put between upper and lower connected metal plates forming a metal terminal. According to the teachings of the invention the one of the metal plates which is placed on the exposed conductor has a projection, such that the projection is in contact with the conductor before the conductor is spot-welded to the metal plates.

The nature, principle and utility of the invention will become more apparent from the following detailed description when read in conjunction with the accompanying drawings.

DETAILED DESCRIPTION OF THE INVENTION

One example of the method of spot-welding a flat-type electrical wire to a metal terminal according to the teachings of this invention will be described with reference to FIG. 3.

Figure 1:
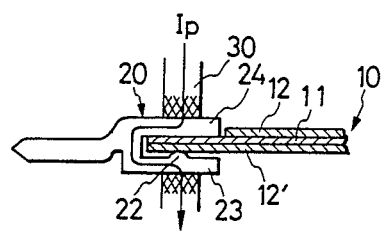
FIG. 1 is a sectional view showing the engagement of a flat-type electrical wire with a metal terminal before being spot-welded according to a conventional method of spot-welding flat-type electrical wires to metal terminals.
Figure 2:
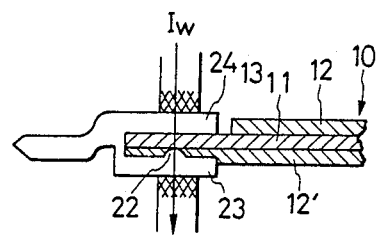
FIG. 2 is a sectional view showing the electrical wire and the metal terminal to which a preheating current is applied according to the conventional method.
Figure 3:
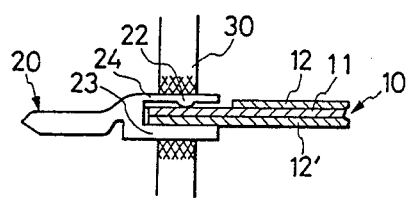
FIG. 3 is a sectional view showing the engagement of a flat-type electrical wire and a metal terminal before being spot-welded according to the method of this invention of spot-welding flat-type electrical wires to metal terminals.
Figure 4:
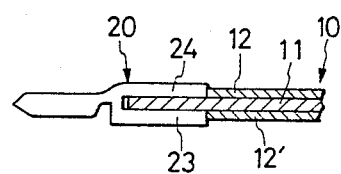
FIG. 4 is a sectional view showing the electrical wire and the metal terminal which have been spot-welded according to the method of the invention.

As shown in FIG. 3, one end portion of a flat-type electrical wire 10 in which the conductor 11, sandwiched between insulators 12 and 12', has been exposed to one side, is inserted into a metal terminal 20 comprising a first metal plate 24 having a projection 22 and a second metal plate 23 connected to the metal plate 24, in such a manner that the projection 22 is in contact with the exposed conductor 11 of the flat-type electrical wire 10 while the metal plate 23 is in contact with the insulator 12'. Thereafter, a preheating current is applied to the metal terminal 20 by a spot welding machine. FIG. 4 shows the metal terminal and the end portion of the electrical wire which has been spot-welded together using the method of this invention.

When the conductor 11 of the flat-type electrical wire 10 is welded to the metal terminal 20 while a predetermined load is applied thereto by means of the welding electrodes 30, the load can be effectively concentrated because the contact area between the projection 22 and the conductor 11 is small. The contact resistance between the projection 22 and the conductor 11, which are both metal, is at all times lower than that between the conductor 11 and the second metal plate 23, since the second metal plate 23 pushes through the insulator 12' made molten by the preheating current $I_p$ (cf. FIG. 3) to contact the conductor. Therefore, the contact area between the second metal plate 23 and the conductor 11 is larger than that between the conductor 11 and the projection 22. Accordingly, the second metal plate 23 and the conductor 11, the contact resistance between which is high, are at all times sufficiently welded together. As a result, the spot welding strength is stable.

The following Table 1 indicates terminal board peel strengths for spot welding strengths. As is apparent from Table 1, in the method of the invention, the variance is about ⅓ of that in the conventional method, and the spot welding strength is more stabilized.

TABLE 1

| Item | Spot Welding Peel Strength | |
|---|---|---|
| | Conventional Method | Method of Invention |
| Number of test | 30 | 30 |
| Minimum peel strength kg | 0.11 | 1.95 |
| Maximum peel strength kg | 3.12 | 2.50 |
| x kg | 2.14 | 2.25 |
| a kg | 0.683 | 0.202 |

The invention will now be described with reference to a concrete example.

Figure 5:
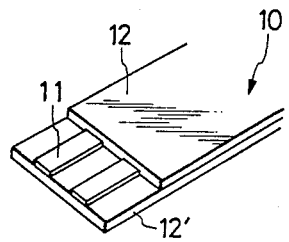
FIG. 5 is a perspective view showing one end portion of a flat-type electrical wire from which an insulator has been removed to expose electrical conductors on one side.

FIG. 5 is a perspective view of a flat type electrical wire 10. Its conductors 11 are copper conductors 0.14 mm in thickness and 1.5 mm in width which are plated with solder (tin 90% and lead 10%) to a thickness of about 2 μm. The conductors are put between two compound film insulators 12 and 12' of a polyester layer (50 μm in thickness) and a PVC layer with the PVC layers set interior of the polyester layer. The PVC layers are joined together by heating. In this way a flat-type electrical wire is formed. It is understood that the conductors may be rectangular or circular in cross-section, and any plating material which is used for ordinary electrical wires can be used. In addition, the above mentioned insulator material is for example only and it is to be further understood that the insulator is not limited to those materials and may be made of other known thermoplastic plastics.

One end portion of the flat-type electrical wire is as shown in FIG. 5. More specifically, a portion of its insulator 12 is removed to expose the conductors 11. The conductor-exposed portion is preferably 5 mm in length.

Figure 6:
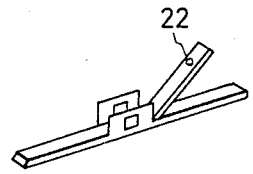
FIG. 6 is a perspective view showing one example of a metal terminal employed in the method of the invention.
Figure 7:
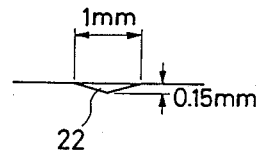
FIG. 7 is an enlarged diagram showing a projection formed on a metal plate of the metal terminal employed in the method of the invention.

One example of the metal terminal which may be used with this invention is shown in FIG. 6. The metal terminal is formed by plating a phosphor bronze plate 0.4 mm in thickness with nickel to a thickness of 1.5 μm and then with gold to a thickness of 1 μm. Its projection 22 is in the form of a cone 1 mm in bottom diameter and 0.15 mm in height as illustrated in FIG. 7.

In the spot welding method, as shown in FIG. 3, the electrical wire 10 is put between the upper and lower plates of the metal terminal 20, and the upper and lower plates of the metal terminal 20 are held between tungsten electrodes of the welding machine 1.5 mm in diameter and having a flat end face. A preheating current of 0.5 kA is applied to the metal terminal with a period of 0.22 second for six cycles while a load of 4 kg is being applied thereto, so that the insulator remaining in the end portion of the electrical wire is made molten. Thereafter, a welding current of 1.5 kA is applied for about 0.02 second.

As described above, in the method of the invention, the spot welding is carried out with one end portion of a flat-type electrical wire, in which the conductor is exposed on one side, engaged with a metal terminal in such a manner that the projection of the metal terminal is in direct contact with the exposed conductor. Therefore, the resultant weld is of high quality and reliability. Application of the method of the invention especially to connections in the signal transmission path of a computer and electronic circuits in an automobile can greatly reduce connection failures.

What is claimed is:

1. In a method of spot welding a flat-type electrical conductor, consisting of at least one conductor sandwiched between insulators, to a metal terminal, consisting of first and second metal plates at least partially connected to each other, comprising the steps of:

removing the insulator from one side of the conductor at an end portion of the flat-type electrical conductor to expose the conductor on said one side;

providing one of said first and second metal plates with a projection;

placing said first and second metal plates over said end portion of the flat-type electrical conductor such that the one of the first and second metal plates with the projection is disposed over said exposed conductor; and contacting said projection with said exposed conductor before said conductor is spot-welded to said metal plates.

2. In the method of spot welding a flat-type electrical conductor as claimed in claim 1 further including the steps of:

contacting the remaining insulator on said end portion with the metal plate without a projection before said conductor is spot-welded to said metal plates;

applying a preheating current to said metal plates to melt the remaining insulator contacting the metal plate without a projection to thereby create an electrical contact between the conductor and the metal plate without a projection; and thereafter, applying a welding current to said metal plates.

3. In the method of spot welding a flat-type electrical conductor as claimed in claim 2, wherein said step of providing a projection to one of said first and second metal plates includes forming said projection as a cone having a base diameter of substantially 1 mm and a height of substantially 0.15 mm.

* * * * *